UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

BRIQUET AND PROCESS OF MANUFACTURING THE SAME.

1,311,221.

Specification of Letters Patent. Patented July 29, 1919.

No Drawing. Application filed June 22, 1917. Serial No. 176,280.

*To all whom it may concern:*

Be it known that I, CARLETON ELLIS, a citizen of the United States, and a resident of Montclair, in the county of Essex and State of New Jersey, have invented certain new and useful Improvements in Briquets and Processes of Manufacturing the Same, of which the following is a specification.

This invention relates to a process of making briquets or other molded articles involving the use of concentrated sulfite cellulose waste liquor solids and to the product of such method. The process comprises incorporating a bulking agent, by which I mean the primary material or materials which are to be bound together, with the concentrated solids of cellulose sulfite waste liquor. Bulking agents may be, for example, coal dust or fines, culm, lignite, sawdust, mineral fillers, talc, magnesite, crushed rock, iron ore, sand, fiber, asbestos and the like. Preferably an acid form of the solids of cellulose sulfite waste liquor is used. Such solids may be obtained of a substantially water-soluble character for example, being readily soluble in cold water. The binding agent is mixed with the bulking material, molded and the waste liquor solids suitably coagulated and insolubilized to afford a substantially water resistant briquet or other molded article. Coagulation may be effected for example by means of a precipitant such as lime (calcium oxid). The reaction may be modified by heating. The waste liquor solids preferably employed may be in an unstable or in some cases colloidal form due to the effect of concentration so that the act of neutralization or over-neutralization (an excess of precipitating agent being preferably employed) induces not merely chemical combination but a polymerization or some similar form of coagulation. While the acid form of the waste liquor solids is preferred, I do not mean to exclude the neutral or alkaline, or hydrolyzed or other forms or derivatives of the waste liquor or other binding agent which may be of a substantially equivalent character from the viewpoint of the present invention.

As indicated I prefer to use caustic lime in the product to aid in coagulation or rendering the waste liquor solids suitably insoluble. Quick lime or hydrated lime may be employed. The dry hydrate or a paste or milk of lime may be used. In some cases calcium saccharate or barium hydrate may be used either alone or in conjunction with lime.

In preparing, for example, a briquet from culm, lignite or other coal material of various sorts the sulfite liquor material when used in a liquid state may be mixed with this material to uniformly coat the particles thereof and a precipitant or assistant of coagulation such as lime in fine powder may then be admixed, or the coal may first be floured with the lime and the sulfite liquor then added and thoroughly incorporated. Under these conditions to secure the best results briqueting or forming into shape should take place before material setting has occurred. The amount of briqueting pressure varies according to circumstances. On the weight of the coal employed from 6 to 12 per cent. of sulfite liquor of about 30° B. may be used, the proportion varying between these and other limits according to the character of the coal, amount of briqueting pressure, etc. The coal particles need not be uniformly coated with the sulfite liquor provided sufficient of the latter be present to secure the requisite bonding effect.

About 50% of lime based on the weight of 30° B. liquor is a satisfactory amount. 30% or even somewhat less will sometimes serve but the setting time is greatly protracted. From 30 to 50 per cent. is recommended for general operation. This may be exceeded in some cases. The dilution of the concentrated liquor with 20 to 50 per cent. of water retards the setting time in most cases. Thus in various ways the setting time may be controlled effectively when using lime as a precipitant or assistant in coagulating or polymerizing the sulfite liquor solids.

The present invention specifically embraces the use of the dried solids of concentrated cellulose sulfite waste liquor. These may be used in a powdered form and may be mixed with the coal or other material used as a bulking substance. Lime may be added if desired, either before or after or with such mixture. Water is added and the mass is molded into definte shapes, such as briquets and the reaction of coagulation and polymerization subsequently caused to take place. As stated the molded material is advantageously heated during the coagulating stage.

Drying the sulfite liquor to a solid form is desirable for various reasons such as convenience of shipment and readiness with which the material may be incorporated with coal or similar stock used as the bulking material. Hence the sulfite liquor may be dried to a solid and ground to a powder or preferably the sulfite liquor is dried by atomization in a suitable atomizing system which yields the material in a highly desirable pulverulent form. The use of pulverulent solids formed by drying sulfite liquor by atomization forms a part of the present invention. The peculiar form obtained by such drying by atomization gives a binder which incorporates well in a dry condition with the bulking material and a good working mass is obtained on the addition of a suitable amount of water. By atomizing the acid sulphite cellulose waste liquor an acid binder of the dried solids in pulverulent form is obtained.

In producing a dry product by atomizing drying the sulfite liquor may be sprayed with hot gases so as to produce an oxidizing effect on the sulfite liquor in the manner particularly referred to in my copending application Serial No. 779,516 filed July 17, 1913. In this copending application it is stated that instead of concentrating to a syrupy body of about 30° B., which is about the strength of the concentrated sulfite liquor now on the market and used as a binding material, I may carry the concentration much further removing preferably almost the entire content of water so as to produce a solid product preferably carrying out this drying operation in the presence of small quantities of oxygen so that the oxidation of the product and particularly the preferred form of semi acid product occur in slight measure during the concentration giving the material what may be termed a "quick aging" treatment so that those bodies which are of relatively slight stability are oxidized to the desired extent. Thus in drying the solids by atomization the sulfite liquor may be treated with hot gases containing a less amount of oxygen than is present in ordinary air, thus securing the slight oxidation desired. The drying may be carried out in a two stage operation by concentrating the raw liquor in vacuum pans and then finishing the drying by atomization. It should be understood that I do not necessarily dry the product to remove all the moisture but if desired may dry simply to a point where the bulk of the moisture is removed and a solid pulverulent material is obtained of sufficiently good keeping qualities. This material may then be used in the preparation of briquets or other molded objects or plastic masses in accordance with the details set forth herein.

Beside the calcareous material containing quicklime and the like mentioned as useful in the coagulation or precipitation of the sulfite liquor solids it is likewise possible to use silicate of soda as mentioned in my copending application 779,516 and the silicate of soda may be admixed with the dry pulverulent material to form a powder which may be subsequently incorporated with the coal fragments or other bulking material, water added and a plastic mass formed which is shaped in the presses and allowed to set to give the waterproof product, which effect or reaction may be modified by heating, or the silicate of soda may be added in the form of a solution as water glass to the solution of the sulfite liquor and incorporated with the bulking material, or the silicate of soda may be added as a solution to the bulking material and the sulfite liquor solids or a solution made therefrom from the dried solids incorporated with one of these ingredients and the molded article formed therefrom. In this connection it may be stated that heating to between say 100 and 200° C. accelerates the reaction and hastens the insolubilization in an advantageous manner so that the product is quickly made ready for shipment for exposure under conditions where waterproof qualities are desired.

In fuel briquets made with any sulfite liquor product, such as have been proposed in numerous patents of various inventors, the sulfite liquor product, by a process of slow oxidation by the intervention of atmospheric air, may eventually produce a more or less insoluble material. In the present case I may add to the sulfite solids, at the time of manufacture of briquets or other shaped products, lime or equivalent material, or otherwise cause an insolubilization of the waste liquor solids to be effected at once. This or other operations capable of producing the insolubilization or coagulation of the liquor solids may be referred to as "artificially insolubilizing the said liquor solids."

In case the solids are applied in a somewhat granular condition, the outside portions of the granules would first come into contact with the lime or equivalent material. Such action might insolubilize the surface of such granules and thereby prevent action on the interior thereof. In any event, however, at least a portion of the liquor solids would be rendered insoluble.

What I claim is:—

1. The process of making briquets or other molded articles which comprises incorporating a bulking material and a binding agent comprising atomized dried slightly-oxidized water-soluble solids of sulfite cellulose waste liquor, in forming into shaped masses, and in insolubilizing said water-soluble solids; whereby a substantially water resistant briquet or other molded article is obtained.

2. The process of making briquets or other molded articles which comprises incorporating a bulking material with a binding agent comprising atomized dried slightly oxidized water-soluble solids of acid sulfite cellulose waste liquor, in forming into shaped masses, and in insolubilizing said water-soluble solids; whereby a substantially water resistant briquet or other molded article is obtained.

3. The process of making briquets or other molded articles which comprises incorporating a bulking material with a binding agent comprising atomized dried slightly oxidized water-soluble solids of acid sulfite cellulose waste liquor, and in forming into shaped masses.

4. The process of making briquets or other molded articles which comprises incorporating a bulking material and a binding agent comprising atomized dried slightly oxidized water-soluble solids of sulfite cellulose waste liquor having an acid content lower than normal, in forming into shaped masses, and in insolubilizing said water-soluble solids; whereby substantially water resistant briquet or other molded article is obtained.

5. In the manufacture of briquets, the step which comprises incorporating a bulking agent with oxidized sulfite cellulose waste liquor solids dried by atomization.

6. In the manufacture of briquets, the step which comprises incorporating a bulking agent with slightly oxidized sulfite cellulose waste liquor solids dried by atomization.

7. In the manufacture of briquets, the step which comprises incorporating a bulking agent with air-oxidized sulfite cellulose waste liquor solids dried by atomization.

8. In the manufacture of briquets, the step which comprises incorporating a bulking agent with oxidized sulfite cellulose waste liquor acid solids dried by atomization.

9. The process of making briquets or other molded articles which comprises incorporating a bulking material with a binding agent comprising dry water-soluble solids of sulfite cellulose waste liquor, which solids have been oxidized during the drying step.

10. The process of making briquets or other molded articles which comprises incorporating a bulking material with an acid binding agent comprising dry water-soluble solids of sulfite cellulose waste liquor, which solids have been oxidized during the drying step.

11. The process of making shaped articles which comprises incorporating a bulking material with a binding agent comprising dry water-soluble solids of sulfite cellulose waste liquor, which solids have been oxidized during the drying step, and shaping the mixture.

12. The process of making shaped articles which comprises incorporating a bulking material with a binding agent comprising dry water-soluble solids of sulfite cellulose waste liquor having an acid content less than that of the raw waste liquor, which solids have been oxidized during the drying step.

13. In the manufacture of briquets, the step which comprises incorporating a bulking agent and calcareous material with oxidized sulfite cellulose waste liquor solids dried by atomization under regulated oxidizing conditions.

14. In the manufacture of briquets, the step which comprises incorporating a bulking agent and calcareous material with sulfite cellulose waste liquor solids dried by atomization under regulated oxidizing conditions.

15. In the manufacture of briquets, the step which comprises incorporating a bulking agent and calcareous material with acid sulfite cellulose waste liquor solids dried by atomization under regulated oxidizing conditions.

16. In the manufacture of briquets, the step which comprises incorporating a bulking agent and calcareous material with acid oxidized sulfite cellulose waste liquor solids dried by atomization under regulated oxidizing conditions.

17. A shaped article composed of a composition including a filler and oxidized coagulated sulfite cellulose waste liquor solids which have been dried by atomization.

18. A briquet comprising coal fragments and oxidized coagulated acid sulfite cellulose waste liquor solids which have been dried by atomization.

19. A briquet comprising coal fragments and slightly oxidized coagulated sulfite cellulose waste liquor solids which have been dried by atomization.

20. A briquet comprising coal fragments and oxidized coagulated sulfite cellulose waste liquor solids.

21. A process of making shaped articles which comprises incorporating a bulking material with an adhesive binding material containing the solids of concentrated acid oxidized sulfite cellulose waste liquor, and insolubilizing said liquor solids.

CARLETON ELLIS.